(12) United States Patent
Hashiguchi et al.

(10) Patent No.: US 12,531,969 B2
(45) Date of Patent: Jan. 20, 2026

(54) OPTICAL TRANSMISSION SYSTEM

(71) Applicant: Nihon Video System Co., LTD., Aichi (JP)

(72) Inventors: Kentaro Hashiguchi, Aichi (JP); Akikazu Hashiguchi, Aichi (JP)

(73) Assignee: NIHON VIDEO SYSTEM CO., LTD., Aichi (JP)

( * ) Notice: Subject to any disclaimer, the term of this patent is extended or adjusted under 35 U.S.C. 154(b) by 0 days.

(21) Appl. No.: 18/798,474

(22) Filed: Aug. 8, 2024

(65) Prior Publication Data
US 2025/0055962 A1    Feb. 13, 2025

(30) Foreign Application Priority Data

Aug. 10, 2023    (JP) ................. 2023-131092

(51) Int. Cl.
*H04N 7/22*      (2006.01)
*H04B 10/50*     (2013.01)

(52) U.S. Cl.
CPC ............ *H04N 7/22* (2013.01); *H04B 10/50* (2013.01)

(58) Field of Classification Search
CPC ................. H04N 7/22; H04B 10/50
See application file for complete search history.

(56) References Cited

U.S. PATENT DOCUMENTS

| | | | |
|---|---|---|---|
| 2014/0049637 A1* | 2/2014 | Hashiguchi | H04N 7/18 348/143 |
| 2021/0021762 A1* | 1/2021 | Hashiguchi | H04N 23/69 |
| 2023/0396743 A1 | 12/2023 | Hashiguchi et al. | |

FOREIGN PATENT DOCUMENTS

| | | |
|---|---|---|
| JP | 2014-027617 A | 2/2014 |
| JP | 6962627 B1 | 11/2021 |
| KR | 10-2017-0142229 | 12/2017 |

OTHER PUBLICATIONS

Japanese office Action for 2023-131092, mailed Nov. 7, 2023.

* cited by examiner

*Primary Examiner* — Michael E Teitelbaum
(74) *Attorney, Agent, or Firm* — Christensen O'Connor Johnson Kindness PLLC

(57) ABSTRACT

The present invention aims to improve convenience and comfort when installing and using an optical transmission device for transmitting video signals. The present invention provides an adapter and a base station for an optical transmission system that optically transmits analog video signals or digital video signals between the adapter-base station pair, the adapter and the base station comprising a lens controller and an intercom function, the optical transmission system operating connected devices.

12 Claims, 1 Drawing Sheet

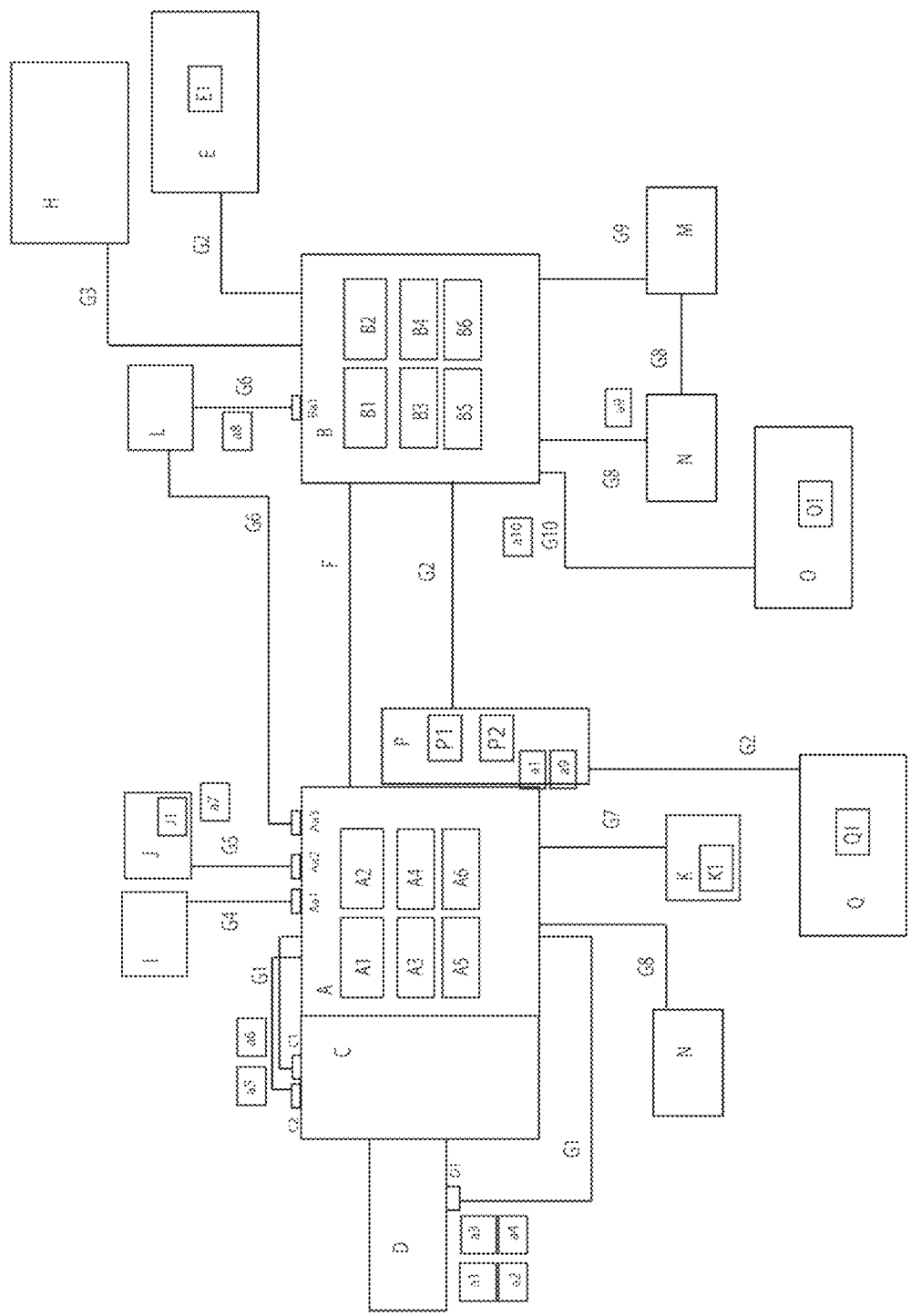

OPTICAL TRANSMISSION SYSTEM

BACKGROUND OF THE INVENTION

Field of the Invention

The present invention relates to an optical transmission system that optically transmits analog video signals or digital video signals between an optical base station and an optical camera adapter.

Description of the Related Art

Video signals of a video shot by a video camera are sent to a video switcher, etc., via a transmission cable. However, if these devices are installed far away, it is difficult to transmit electrical signals without attenuation. Hence, to perform long-distance transmission, electrical signals are converted into optical signals on the video camera side, and the optical signals are transmitted via an optical transmission cable and converted into electrical signals on the distant device side (e.g., Patent Literature 1).

Patent Literature

Patent Literature 1: JPB6962627

SUMMARY OF THE INVENTION

Technical Problem

Adapters for transmission using optical cables are nowadays used as commercial equipment for broadcasting. However, adapters using optical cables can be used to transmit not only video signals such as SDI, but also audio signals, time codes, intercoms, and many other signals, and hence there is a strong demand for multi-functionality.

At filming locations, more and more equipment with multi-functionality is being used, and there is a need to reduce space or preparation time and to improve usability, and a need for optical transmission adapters with self-control functions, etc.

The above circumstances have led to application of the present invention so as to improve the convenience and comfort at filming sites.

Solution to Problem

According to the present invention, the following perspectives are provided.
(1) An optical transmission system, comprising an optical base station and an optical camera adapter, wherein the system optically transmits an analog video signal, a digital video signal, a control signal, an audio signal, or combination thereof between the optical base station and the optical camera adapter, the optical camera adapter is connectable to a connector for a broadcasting lens, the optical base station is connectable to a lens controller, and the lens controller is capable of controlling at least one of an iris signal, a focus signal, a zoom signal, of the broadcasting lens connected to the optical camera adapter, or a return video signal.
(2) The optical transmission system of (1), wherein at least one of the optical camera adapter or the optical base station include a control section that is capable of controlling at least one of an iris signal, a focus signal, a zoom signal, of the lens connected to the optical camera adapter, or a return video signal.
(3) The optical transmission system of (1), further comprising a control section that is capable of controlling at least one of an iris signal, a focus signal, a zoom signal, of the lens connected to the optical camera adapter, or a return video signal, wherein the optical camera adapter is connected via a cable to a lens connector for a connected video production camera, an iris signal of the camera is controlled using a manual iris signal generated from the lens controller, the optical base station, or the optical camera adapter, and lens control of one or more of cameras is performed by switching between an auto iris signal of the camera and a manual iris signal from the lens controller, the optical base station, or the optical camera adapter using a change-over switch that the optical camera adapter and the optical base station include or using the lens controller connected to the optical base station.
(4) The optical transmission system of any one of (1) to (3), wherein a video signal is outputted to at least one of a viewfinder output connector or a viewfinder output terminal of the optical camera adapter, wherein the video signal is a camera signal inputted into the optical camera adapter, and is switched into a return video signal inputted into the optical base station or the optical camera adapter while a return video signal display switch of the lens is pressed.
(5) The optical transmission system of any one of (1) to (3), wherein a video signal is outputted to at least one of a viewfinder output connector or a viewfinder output terminal of the optical camera adapter, wherein the video signal is a camera signal inputted into the optical camera adapter, and is switched into a return video signal inputted into the optical base station or the optical camera adapter while a zoom remote-control push button switch connected to the optical camera adapter is pressed.
(6) The optical transmission system of any one of (1) to (3), further comprising an output connector through which a return switching signal of the lens, a camera video signal, and a tally signal of a return video signal are outputted using a switching function of a viewfinder between an input 1 and an input 2.
(7) The optical transmission system of any one of (1) to (6), wherein a signal of a connected camera is convertible into a LAN output signal inside the optical camera adapter and transmittable to the optical base station.
(8) The optical transmission system of any one of (1) to (7), wherein when using an optical spectrometer on each side of the optical camera adapter-optical base station pair, the optical spectrometer transmitting, inside the optical camera adapter, a video signal from a connected camera and each signal connected to the base station through a single optical cable, which is analogous to CWDM or DWDM transmitting multiple frequencies through a single optical cable, at least one of a control signal from the camera, a tally signal, a camera signal, or a camera control signal are convertible into a LAN output signal, and a video signal converted into a LAN signal and a conventional signal are able to be outputted separately or simultaneously, the video signal being outputted from the optical camera adapter or the optical base station, the conventional signal being outputted from the optical base station.
(9) The optical transmission system of any one of (1) to (8), wherein an intercom control section is provided on back of the adapter during operation, which is analogous to a studio camera for broadcasting.

(10) The optical transmission system of any one of (1) to (9), wherein a camera, a viewfinder, and a monitor that are connected to the optical camera adapter are able to be powered on and off from a lens remote and a camera control unit that are connected to the optical base station.

(11) The optical transmission system of any one of (1) to (9), wherein on a control panel installed to back of the optical camera adapter, a remote controller is attached, the remote controller being attachable to the back using an attachment fitting or to a battery mount and having a function of at least one of an intercom volume adjuster or an iris controller.

(12) The optical transmission system of any one of (1) to (9), wherein on a control panel installed to back of the optical camera adapter, a remote controller, with an iris display function, of a remote-control section is attached, the remote-control section being attachable to the back using an attachment fitting or to a battery mount and having a function of at least one of an intercom volume adjuster or an iris controller.

(13) The optical transmission system of any one of (1) to (9), wherein on a control panel installed to back of the optical camera adapter, when a remote-control section is attached or detached, a remote controller that is also connectable to a connector of the base station is attached, the remote-control section being attachable to the back using an attachment fitting or to a battery mount and having a function of at least one of an intercom volume adjuster or an iris controller.

BRIEF DESCRIPTION OF THE DRAWING

FIG. 1 is a block diagram showing an optical transmission system according to a first embodiment of the present invention.

DESCRIPTION OF THE PREFERRED EMBODIMENT

Embodiments of the present invention are described below using the drawing.
1. First embodiment—configuration of an optical transmission system, and 2. Details of the first embodiment—configuration of the optical transmission system An optical transmission system according to a first embodiment of the present invention is described below using FIG. 1.

In the optical transmission system of this embodiment, an optical camera adapter A is connected to an optical base station B via an optical cable F, and a broadcasting lens connector D1 is connected from the optical camera adapter A using a lens cable G1. A lens controller E is connected to the optical base station B using a remote-control cable G2. Via the optical base station B and the optical camera adapter A, the lens controller E controls at least one of an iris signal a1, a focus signal a2, a zoom signal a3, of the lens, or a return video signal a4 and sends the signal(s) to a broadcasting lens D.

Description of the First Embodiment

In the optical transmission system of this embodiment, an optical camera adapter A is connected to an optical base station B via an optical cable F. An optical adapter lens control section A1 of the optical camera adapter A or an optical base station lens control section B1 of the optical base station B is connected to a connector D1 for a broadcasting lens D via a lens cable G1 and controls at least one of an iris signal a1, a focus signal a2, a zoom signal a3, of the lens, or a return video signal a4 and sends the signal(s) to the broadcasting lens D.

Description of the Second Embodiment

An optical camera adapter A is connected to an optical base station B via an optical cable F, and the optical transmission system of this embodiment operates. A lens connector C1 of a camera C is connected to the optical camera adapter A via a cable G1, and an auto iris signal a5 from the camera C is connected to the optical camera adapter A. An auto iris signal a5 from the camera C and a manual iris signal a1 from the optical camera adapter A, the optical base station B, or a lens controller E are switched using a changeover switch of the optical camera adapter A or the optical base station B, such as an optical camera adapter iris signal changeover switch section A2 or an optical base station iris signal changeover switch section B2.

Description of the Third Embodiment

An optical camera adapter A is connected to an optical base station B via an optical cable F, and the optical transmission system of this embodiment operates. A camera signal a6 inputted into the optical camera adapter A and a return video signal a4 from a switcher H or the like connected to the optical base station B via a cable G3 are inputted. While an optical camera adapter return video signal display switch A3, an optical base station return video signal display switch section B3, or a zoom remote control switch K1 of a zoom remote controller K is pressed, switching is made to a return video signal a4 connected to the optical base station or the optical camera adapter, and the return video signal a4 is outputted into at least one of an SDI output connector Aa1 or a viewfinder output terminal Aa2 of the optical camera adapter.

Description of the Fourth and the Fifth Embodiments

An optical camera adapter A is connected to an optical base station B via an optical cable F, and the optical transmission system of this embodiment operates. The optical camera adapter A and a viewfinder J are connected via a viewfinder output terminal Aa2 and a viewfinder cable G5. A camera signal a6, a return video signal a4, and a tally signal a7 pass through each of the optical camera adapter A, the viewfinder J, the viewfinder output terminal Aa2, and the viewfinder cable G5. A switching function J1 of the viewfinder J activates by pressing a zoom remote control switch K1 of a zoom remote controller K, and a camera signal a6, return video signal a4, and tally signal a7 are switched.

Description of the Sixth Embodiment

An optical camera adapter A is connected to an optical base station B via an optical cable F, and the optical transmission system of this embodiment operates. A LAN signal conversion board in the optical camera adapter A converts a camera signal a6 into a LAN signal a8 and transmits it to the optical base station B. Alternatively, conversion into a LAN signal a8 is carried out by a LAN signal conversion board B4 in the optical base station B. The LAN signal a8 from a LAN terminal Ba1 is used by a LAN compatible device L via a LAN cable G6.

Description of the Seventh Embodiment

An optical camera adapter A is connected to an optical base station B via an optical cable F, and the optical transmission system of this embodiment operates. An optical spectrometer A5 inside the optical camera adapter A or an optical spectrometer B5 inside the optical base station B each converts a manual iris signal a1, a focus signal a2, a zoom signal a3, a return video signal a4, an auto iris signal a5, a camera signal a6, and/or a tally signal a7 into an optical signal, which is then converted into a LAN signal a8 by either a LAN signal conversion board A4 or a LAN signal conversion board B4 of the optical camera adapter-optical base station pair. The LAN signal a8 is outputted into a LAN terminal Aa3 or a LAN terminal Ba1.

Description of the Eighth Embodiment

An optical camera adapter A is connected to an optical base station B via an optical cable F, and the optical transmission system of this embodiment operates. An intercom control section A6 inside the optical camera adapter A is used to control an intercom. The intercom system allows a headset N to be connected to the optical camera adapter A, the optical base station B, or an intercom device M via a headset cable G8. The intercom device M may be connected to the optical base station B via an intercom device connection cable G9.

Description of the Ninth Embodiment

An optical camera adapter A is connected to an optical base station B via an optical cable F, and the optical transmission system of this embodiment operates. A lens controller E or camera control unit O is connected to the optical base station B, and a switch signal a10 transmitted from a connected device ON/OFF switch E1 inside the lens controller E or from a connected device ON/OFF switch O1 inside the camera control unit O controls, via the optical camera adapter A, turning on and off of a viewfinder J and one of a connected camera C or a monitor I.

Description of the Tenth Embodiment

An optical camera adapter A is connected to an optical base station B via an optical cable F, and the optical transmission system of this embodiment operates. A control panel P is attached to the back of the optical camera adapter A using a V mount or attachment fittings. The control panel P is equipped with an intercom volume adjuster P1 and an iris controller P2. The intercom volume adjuster P1 adjusts an intercom signal a9, and the iris controller P2 controls a manual iris signal a1.

Description of the Eleventh Embodiment

An optical camera adapter A is connected to an optical base station B via an optical cable F, and the optical transmission system of this embodiment operates. A control panel P is attached to the back of the optical camera adapter A using a V mount or attachment fittings. An iris remote controller Q equipped with an iris display function Q1 is attachable to the control panel P, allowing transmission of an iris signal a1 into the control panel P or a reflection of an iris signal of the control panel P on the iris display function Q1.

Description of the Twelfth Embodiment

An optical camera adapter A is connected to an optical base station B via an optical cable F, and the optical transmission system of this embodiment operates. A control panel P is attached to the back of the optical camera adapter A using a V mount or attachment fittings. Even if the control panel P is detached from the optical camera adapter A, same operations can be performed by connecting the control panel P to the optical base station B to which a remote control cable G2 is attachable.

A: optical camera adapter,
A1: optical camera adapter lens control section,
A2: optical camera adapter iris signal changeover switch section,
A3: optical camera adapter return video signal display switch,
A4: LAN signal conversion board,
A5: optical spectrometer,
A6 intercom operation section,
Aa1: SDI output connector,
Aa2: viewfinder output terminal,
Aa3: LAN terminal,
B: optical base station,
B1: optical base station lens control section,
B2: optical base station iris signal changeover switch section,
B3: optical base station return video signal display switch section,
B4: LAN signal conversion board,
Ba1: LAN terminal,
B5: optical spectrometer,
C: camera,
C1: camera lens connector,
D: broadcasting lens,
D1: broadcasting lens connector,
E: lens controller,
E1: connected device ON/OFF switch,
F: optical cable,
G1: lens cable,
G2: remote control cable,
G3: switcher cable,
G4: SDI cable,
G5: viewfinder cable,
G6: LAN cable,
G7: zoom remote control cable,
G8: headset cable,
G9: intercom device connection cable,
G10: camera control unit cable,
H: switcher,
I: monitor,
J: viewfinder,
J1: input switching function,
K: zoom remote controller,
k1: zoom remote control switch,
L: LAN compatible equipment,
M: intercom equipment,
N: headset,
O: camera control unit,
O1: connected device ON/OFF switch,
P: control panel,
P1: intercom adjustment volume,
P2: iris controller,
Q: iris remote controller, Q1: iris display function,
a1: manual iris signal,
a2: focus signal,
a3: zoom signal,
a4: return video signal,
a5: auto iris signal,
a6: camera signal,
a7: tally signal,
a8: LAN signal,
a9: intercom signal,
a10: switch signal.

What is claimed is:

1. An optical transmission system, comprising:
an optical base station; and
an optical camera adapter,
wherein
the system optically transmits an analog video signal, a digital video signal, a control signal, an audio signal, or combination thereof between the optical base station and the optical camera adapter;
the optical camera adapter is connectable to a connector for a broadcasting lens;
the optical base station is connectable to a lens controller; and
the lens controller is capable of controlling at least one of an iris signal, a focus signal, a zoom signal, of the broadcasting lens connected to the optical camera adapter, or a return video signal;
the system further comprising:
a control section that is capable of controlling at least one of the iris signal, the focus signal, the zoom signal, of the lens connected to the optical camera adapter, or the return video signal,
wherein
the optical camera adapter is connected via a cable to a lens connector for a connected video production camera;
an iris signal of the camera is controlled using a manual iris signal generated from the lens controller, the optical base station, or the optical camera adapter; and
lens control of one or more of cameras is performed by switching between an auto iris signal of the camera and a manual iris signal from the lens controller, the optical base station, or the optical camera adapter using a changeover switch that the optical camera adapter and the optical base station include or using the lens controller connected to the optical base station.

2. The optical transmission system of claim 1, wherein at least one of the optical camera adapter or the optical base station includes a control section that is capable of controlling at least one of the iris signal, the focus signal, the zoom signal, of the lens connected to the optical camera adapter, or the return video signal.

3. The optical transmission system of claim 1, wherein a video signal is outputted to at least one of a viewfinder output connector or a viewfinder output terminal of the optical camera adapter, wherein
the video signal is a camera signal inputted into the optical camera adapter, and is switched into the return video signal inputted into the optical base station or the optical camera adapter while a return video signal display switch of the lens is pressed.

4. The optical transmission system of claim 1, wherein a video signal is outputted to at least one of a viewfinder output connector or a viewfinder output terminal of the optical camera adapter, wherein
the video signal is a camera signal inputted into the optical camera adapter, and is switched into the return video signal inputted into the optical base station or the optical camera adapter while a zoom remote-control push button switch connected to the optical camera adapter is pressed.

5. An optical transmission system of claim 1, further comprising:
an optical base station; and
an optical camera adapter,
wherein
the system optically transmits an analog video signal, a digital video signal, a control signal, an audio signal, or combination thereof between the optical base station and the optical camera adapter;
the optical camera adapter is connectable to a connector for a broadcasting lens;
the optical base station is connectable to a lens controller; and
the lens controller is capable of controlling at least one of an iris signal, a focus signal, a zoom signal, of the broadcasting lens connected to the optical camera adapter, or a return video signal;
the system further comprising:
an output connector through which a return switching signal of the lens, a camera video signal, and a tally signal of the return video signal are outputted using a switching function of a viewfinder between an input 1 and an input 2.

6. The optical transmission system of claim 1, wherein a signal of a connected camera is convertible into a LAN output signal inside the optical camera adapter and transmittable to the optical base station.

7. An optical transmission system comprising:
an optical base station; and
an optical camera adapter,
wherein
the system optically transmits an analog video signal, a digital video signal, a control signal, an audio signal, or combination thereof between the optical base station and the optical camera adapter;
the optical camera adapter is connectable to a connector for a broadcasting lens;
the optical base station is connectable to a lens controller; and
the lens controller is capable of controlling at least one of an iris signal, a focus signal, a zoom signal, of the broadcasting lens connected to the optical camera adapter, or a return video signal; and
wherein
when using an optical spectrometer on each side of the optical camera adapter-optical base station pair, the optical spectrometer transmitting, inside the optical camera adapter, a video signal from a connected camera and each signal connected to the base station through a single optical cable, which is analogous to CWDM or DWDM transmitting multiple frequencies through a single optical cable, at least one of a control signal from the camera, a tally signal, a camera signal, or a camera control signal are convertible into a LAN output signal, and a video signal converted into a LAN signal and a conventional signal are able to be outputted separately or simultaneously, the video signal being outputted from the optical camera adapter or the optical base station, the conventional signal being outputted from the optical base station.

8. The optical transmission system of claim 1, wherein
an intercom control section is provided on back of the adapter during operation, which is analogous to a studio camera for broadcasting.

9. The optical transmission system of claim 1, wherein
a camera, a viewfinder, and a monitor that are connected to the optical camera adapter are able to be powered on and off from a lens remote and a camera control unit that are connected to the optical base station.

10. The optical transmission system of claim 1, wherein
on a control panel installed to back of the optical camera adapter, a remote controller is attached, the remote controller being attachable to the back using an attachment fitting or to a battery mount and having a function of at least one of an intercom volume adjuster or an iris controller.

11. The optical transmission system of claim 1, wherein
on a control panel installed to back of the optical camera adapter, a remote controller, with an iris display function, of a remote-control section is attached, the remote-control section being attachable to the back using an attachment fitting or to a battery mount and having a function of at least one of an intercom volume adjuster or an iris controller.

12. The optical transmission system of claim 1, wherein
on a control panel installed to back of the optical camera adapter, when a remote-control section is attached or detached, a remote controller that is also connectable to a connector of the base station is attached, the remote-control section being attachable to the back using an attachment fitting or to a battery mount and having a function of at least one of an intercom volume adjuster or an iris controller.

* * * * *